(12) United States Patent
Ronchetti et al.

(10) Patent No.: US 11,772,841 B2
(45) Date of Patent: *Oct. 3, 2023

(54) METHOD FOR PRODUCING A PACKAGING MATERIAL

(71) Applicant: TETRA LAVAL HOLDINGS & FINANCE S.A., Pully (CH)

(72) Inventors: Luca Ronchetti, Carpi (IT); Andrea Giampieri, Modena (IT); Marcello Barbieri, Modena (IT); Davide Morciano, Modena (IT)

(73) Assignee: TETRA LAVAL HOLDINGS & FINANCE S.A., Pully (CH)

( * ) Notice: Subject to any disclaimer, the term of this patent is extended or adjusted under 35 U.S.C. 154(b) by 40 days.

This patent is subject to a terminal disclaimer.

(21) Appl. No.: 17/260,085

(22) PCT Filed: Jul. 9, 2019

(86) PCT No.: PCT/EP2019/068379
§ 371 (c)(1),
(2) Date: Jan. 13, 2021

(87) PCT Pub. No.: WO2020/016053
PCT Pub. Date: Jan. 23, 2020

(65) Prior Publication Data
US 2021/0284379 A1    Sep. 16, 2021

(30) Foreign Application Priority Data
Jul. 16, 2018    (EP) .................................. 18183770

(51) Int. Cl.
*B65D 5/56*    (2006.01)
*B65D 5/42*    (2006.01)
*B65D 5/06*    (2006.01)

(52) U.S. Cl.
CPC ............ *B65D 5/4266* (2013.01); *B65D 5/061* (2013.01); *B65D 5/064* (2013.01); *B65D 5/563* (2013.01)

(58) Field of Classification Search
CPC ...... B65D 5/064; B65D 5/4266; B65D 5/067; B65D 5/4279; B65D 5/56; B65D 5/061–066
(Continued)

(56) References Cited

U.S. PATENT DOCUMENTS 4,586,650 A * 5/1986 Sasaki .................... B65D 5/064
229/920
4,909,432 A * 3/1990 Nagata ................... B65D 5/067
229/920

(Continued)

FOREIGN PATENT DOCUMENTS

CN    103786973 A    5/2014
CN    104309259 A    1/2015
(Continued)

OTHER PUBLICATIONS

Office Action (The First Office Action) dated Jun. 2, 2022, by the State Intellectual Property Office of People's Republic of China in corresponding Chinese Patent Application No. 201980047320.3 and an English Translation of the Office Action. (15 pages).

(Continued)

*Primary Examiner* — Nathan J Newhouse
*Assistant Examiner* — Phillip D Schmidt
(74) *Attorney, Agent, or Firm* — BUCHANAN INGERSOLL & ROONEY PC

(57) ABSTRACT

A packaging material is provided, comprising a core material layer and at least one polymer layer being laminated thereto. The core material layer is provided with at least one area being configured to assist in folding the packaging (Continued)

material into a bottom end corner of a package to be formed, wherein the packaging material comprises a first set of crease lines being designed to form a bottom end of the package, and a second set of crease lines being designed to form a main body of the package. The at least one area comprises an intersection of a plurality of crease lines, each having a triangular cross-section, while a plurality of crease lines of the first set of crease lines, each having a triangular cross-section and having a virtual extension through the intersection, are terminated such that they end at a distance from the intersection.

19 Claims, 10 Drawing Sheets

(58) Field of Classification Search
USPC ... 229/184, 930, 137, 920, 58.4, 198.2, 190, 229/213, 249
See application file for complete search history.

(56) References Cited

U.S. PATENT DOCUMENTS

| 5,848,749 | A | * | 12/1998 | Ljungstrom | ........... | B65D 5/067 |
| | | | | | | 229/137 |
| 11,535,419 | B2 | * | 12/2022 | Ronchetti | ............. | B31B 50/262 |
| 2017/0233133 | A1 | | 8/2017 | Johansson et al. | | |
| 2017/0253365 | A1 | | 9/2017 | Barbieri et al. | | |
| 2019/0337666 | A1 | * | 11/2019 | Dammers | ................. | B32B 7/12 |
| 2021/0269189 | A1 | | 9/2021 | Ronchetti et al. | | |

FOREIGN PATENT DOCUMENTS

| CN | 205274041 | U | | 6/2016 | | |
| CN | 106715277 | A | | 5/2017 | | |
| CN | 107264913 | A | | 10/2017 | | |
| DE | 102016003827 | A1 | * | 10/2017 | ............... | B32B 7/12 |
| DE | 102016003827 | A1 | | 10/2017 | | |
| EP | 1785358 | A1 | * | 5/2007 | ............ | B65D 5/064 |
| WO | 03037730 | A1 | | 5/2003 | | |
| WO | 2015193358 | A1 | | 12/2015 | | |
| WO | WO-2015193358 | A1 | * | 12/2015 | ................ | B31F 1/08 |

OTHER PUBLICATIONS

U.S. Appl. No. 17/260,115, filed Jan. 13, 2021, Luca Ronchetti et al.
International Search Report (PCT/ISA/210) dated Aug. 30, 2019, by the European Patent Office as the International Searching Authority for International Application No. PCT/EP2019/068379.
Written Opinion (PCT/ISA/237) dated Aug. 30, 2019, by the European Patent Office as the International Searching Authority for International Application No. PCT/EP2019/068379.

* cited by examiner

METHOD FOR PRODUCING A PACKAGING MATERIAL

TECHNICAL FIELD

The invention relates to a method for producing a packaging material, and in particular to a method for producing a packaging material being suitable for forming individual packages capable of storing liquid food products.

BACKGROUND ART

Packages for storing liquid food products exist on the market, and filling machines allow such food packages to be produced at a very high speed. According to one well-established principle a continuous sequence of packages are manufactured by forming a running web of packaging material into a tube by sealing the longitudinal ends of the web to each other. As the tube is continuously filled with the liquid content to be stored by the packages, transversal sealing is performed beneath the liquid level in the tube. In a single sealing action two seals are actually created simultaneously; an upper end seal for a leading package, and a bottom end seal for an immediately trailing package. When the sealing action is done, a knife is actuated to cut the tube transversally in the area between the upper end seal and the bottom end seal, thus separating the leading (and now sealed) package from the upstream tube. Alternatively, similar packages may be made from pre-cut blanks or sheets of the laminated packaging material, which are folded and longitudinally sealed into tubular capsules, and then fold-formed at a first end, filled and sealed at the other end, in a stepwise filling operation.

The packaging material is provided with crease lines; these crease lines allow the packaging material to be folded at specific positions defined by the exact arrangement of the crease lines. The crease lines are typically provided on a core material layer of the packaging material, prior to further lamination of the packaging material in order to form inside and outside layers to the core material layer. For this purpose usually a pressing tool, such as a pressing roller, is used wherein an operation surface of the pressing tool has a number of protrusive ridges. When these ridges are pressed in to the core material layer, crease lines are formed.

A crease line is thus a linear deformation of the core material layer, which allows the package to be folded at the specific position of the crease line. Especially for three-dimensional cuboid packages being formed by folding the packaging material along pre-arranged crease lines, some areas are associated with increased forming difficulty. As the machine speed is increasing, both during laminate production but also in terms of filling machine speed, also requiring higher folding and heat sealing speed, the difficulties of forming are also increasing.

Improved crease lines, and a method for producing such, are described in WO2015/193358 by the same applicant. Still, one area being associated with increased difficulty in terms of folding and forming is the bottom end of the package, and especially the corners of the bottom end. Forming of the corners is actually addressed in the above mentioned prior art reference, describing how improved folding of the corners is enabled if the crease lines are intersecting in the corner.

Although the above-mentioned disclosure provides an elegant improvement over earlier attempts to provide accurately shaped bottom corners, there is an everlasting strive to further improve shaping and forming of packages into their desired shape.

There is therefore a need for an improved packaging material.

SUMMARY

It is an object of the invention to at least partly overcome one or more of the above-identified limitations of the prior art. In particular, it is an object to provide a packaging material which allows for well defined folding and forming of the bottom corners.

To solve these objects a packaging material is provided. The packaging material comprises a core material layer and at least one polymer layer being laminated thereto, wherein the core material layer is provided with at least one area being configured to assist in folding the packaging material into a bottom end corner of a package to be formed. The packaging material comprises a first set of crease lines being designed to form a bottom end of the package, and a second set of crease lines being designed to form a main body of the package. The at least one area comprises an intersection of a plurality of crease lines, each having a triangular cross-section, while a plurality of crease lines of the first set of crease lines, each having a triangular cross-section and having a virtual extension through said intersection, are terminated such that they end at a distance from said intersection.

The combination of the distribution of the crease lines at the respective areas, and the triangular cross-section of the crease lines provide for very well-defined corner folding. The reason for this is two-fold; firstly, the triangular cross-section of the crease lines ensures a narrow and well-defined single axis of rotation during folding, whereby the actual folding will occur exactly at the position where an apex of a ridge has been pressed into the packaging material to form the crease line. Secondly, folding of the corners is normally achieved by allowing filling machine folding guides to move along predetermined motion curves; these motion curves are determined by the configuration of cam curves. This means that there is no perfectly linear motion of the folding guides, but instead these follow a curved path during the longitudinal movement of the package. As folding of the package flaps will be guided by the current position of the folding guides, the exact corner position may drift during the folding sequence. The inventors have, in view of this configuration of the filling machine, realized that terminating some crease line slightly before reaching the intersection, while allowing other crease lines to actually meet at the intersection, will allow the exact corner position to float during folding until final folding is achieved. At this final step, perfect alignment of the corner fold is accomplished.

A virtual extension of the aborted terminated crease line of the first set of crease lines may coincide or substantially coincide with one intersecting crease line of the second set of crease lines. Hence, the corner areas will define a rectangular shape of the package.

In an embodiment, the virtual extension of the terminated longitudinal crease line of the first set of crease lines may be offset with from 0.3 to 0.5 mm, from the intersecting longitudinal crease line of the second set of crease lines. In a further embodiment, the virtual extension of the terminated transversal crease line of the first set of crease lines may be offset with from 0.3 to 0.5 mm, from the intersecting transversal crease line of the first set of crease lines. The terminated crease lines of the at least one area may comprise one transversal crease line, one longitudinal crease line, and one diagonal crease line. Improved folding of bottom flaps is thereby enabled.

The intersecting crease lines may be arranged perpendicular to each other, which allows for a rectangular shaped bottom end of the resulting package.

The distance may be in the range from 1 to 10 mm, such as from 1.5 to 5 mm, preferably in the range from 1.5 to 3 mm. This has proven to provide for very beneficial results in terms of corner shaping of the package.

The packaging material may comprise two areas being configured to form two rear bottom corners of a package, wherein each area comprises an intersection of a plurality of crease lines, each having a triangular cross-section. A plurality of crease lines of the first set of crease lines, each having a triangular cross-section and having a virtual extension through said intersection, are terminated such that they end at a distance from said intersection. As the two rear bottom corners are formed by folding of areas being shaped in accordance with the first aspect described herein, it allows for improved forming of the entire bottom, in particular for a Tetra Brik® Aseptic Edgetype of package.

The areas may be configured to form rear bottom corners arranged on opposite sides of a longitudinal sealing area.

The packaging material may comprise four areas being configured to form four bottom corners of a package, wherein each area comprises an intersection of a plurality of crease lines, each having a triangular cross-section. A plurality of crease lines of the first set of crease lines, each having a triangular cross-section and having a virtual extension through said intersection, are terminated such that they end at a distance from said intersection. Such configuration, where all four corners are formed by folding of areas being configured in accordance with the first aspect described herein, has proven to be particularly advantageous for Tetra Brik® Aseptic type of packages.

The cross-section of the triangular crease lines may be asymmetric. Such asymmetric configuration provides some advantages. For example, it will create one significant zone of shear fracture initiation in the packaging material at a position corresponding to the position of a sidewall of the imprint portion of the ridge of the pressing plate used to provide the crease lines. By having an asymmetric imprint portion of the ridge there will be one particularly well defined area at which shear fracture initiation notably occurs, leading to a very well defined fracture upon folding. By operating a pressing tool the applied force will cause stresses downwards in the surface of the packaging material facing the pressing plate. Should a symmetric imprint portion be used a similar effect will be seen, i.e. one focused and defined zone of fracture initiation becomes apparent. The symmetric imprint into the packaging material will become more severe, however, and the method is critical to control within a narrow window of operation, in order to avoid simply cutting through the material by a symmetrically triangular ridge of the press. Thus, asymmetric crease ridges provide more well-defined creases and allow a more robust creasing operation.

According to a second aspect, a package being produced by sealing and forming a packaging material is provided. The package comprises at least one bottom corner being formed by folding a package material at an associated area. The at least one bottom corner is defined by an intersection of a plurality of crease lines, each having a triangular cross-section, while a plurality of crease lines, each having a triangular cross-section and having a virtual extension through said intersection, are terminated such that they end at a distance from said intersection.

According to a third aspect, a method for producing a packaging material is provided. The method comprises providing a core material layer with at least one area being configured to assist in folding the packaging material into a bottom end corner of a package to be formed, and providing a first set of crease lines being designed to form a bottom end of the package, and a second set of crease lines being designed to form a main body of the package, such that said at least one area comprises an intersection of a plurality of crease lines, each having a triangular cross-section, while a plurality of crease lines of the first set of crease lines, each having a triangular cross-section and having a virtual extension through said intersection, are terminated such that they end at a distance from said intersection.

According to a fourth aspect, a plate of a pressing tool for providing crease lines into a core material layer of a packaging material is provided. The plate comprises at least one area being configured to provide crease lines assisting in folding the packaging material into a bottom corner of a package to be formed. The at least one area comprises an intersection an intersection of a plurality of ridges, each having a triangular cross-section, while a plurality of ridges of the first set of crease lines, each having a triangular cross-section and having a virtual extension through said intersection, are terminated such that they end at a distance from said intersection.

The total height of the ridges at the intersection may be approximately the same as the height of a single ridge remote from said intersection. The depth of the resulting crease line will thus be constant over the corner area, whereby the folding action will be easier to control.

The total height of the ridges at the intersection may be between 1 and 2 mm, preferably between 1 and 1.5 mm. This has proven to be a beneficial height in order to provide crease lines of desired dimensions.

The cross-section of the triangular ridges may be asymmetric.

Still other objectives, features, aspects and advantages of the invention will appear from the following detailed description as well as from the drawings.

BRIEF DESCRIPTION OF THE DRAWINGS

Embodiments of the invention will now be described, by way of example, with reference to the accompanying schematic drawings, in which FIG. 4a is a top view of a web of packaging material according to an embodiment, used to form packages, FIG. 4b is an enlarged view of a part of the packaging material shown in FIG. 4a;

DETAILED DESCRIPTION

Packaging material having a core material layer may be used in many different applications for providing cost-efficient, environmentally friendly, and technically superior packages for a vast amount of products. In liquid product packaging, e.g. in liquid food packaging, a carton-based packaging material is often used for forming dimensionally stable packages, which are thus supported to be self-standing also after opening.

The carton-based packaging material which is to be manufactured by the method described herein is configured to be suitable for liquid packaging and has, according to an embodiment, certain properties adapted for the purpose. The packaging material thus has a core material layer of a carton that fulfils the requirements to provide stiffness and dimensional stability to a package produced from the packaging material. The cartons normally used are thus fibrous paperboards, i.e. fiberboards having a bulk of a network structure of cellulose fibres, with suitable density, stiffness and capability of resisting possible exposure to moisture.

Non-fibrous cellulose-based cartons, on the other hand, of the type including corrugated paperboard or honey-comb or cellular paperboards, are so-called structural paperboards and are less likely suitable for the purpose of this invention. Such structural paperboards are instead normally folded and provided with weakening lines for folding by different mechanisms than the present invention. They are constructed according to the I-beam principle wherein a structural middle layer (e.g. corrugated, honeycomb, cellular foam) is sandwich-laminated between thin flanges of paper layers. Due to the in-homogeneous nature of a structural middle layer, the outer flanges are joined to such a structure middle layer only at restricted areas or points, and not joined to it over their entire surfaces.

In particular, the fibrous type of core material layers or cartons or paperboards applicable to packaging materials and methods of this invention, are thus fibrous structures from homogeneous fibre layers, which advantageously also are configured in an I-beam or sandwich arrangement, however with the respective middle layer and flanges being tied to each other over their entire surfaces facing each other. Typical fibres usable for the fibrous bulk are cellulose fibres from chemical pulp, CTMP, TMP, kraft pulp or the like.

According to an embodiment, the fibrous bulk layers, paperboards or cartons, suitable for the purpose of the invention have a density higher than 300 $kg/m^3$, such as higher than 700 $kg/m^3$, and a bending stiffness index from 6.0 to 24.0 $Nm^6/kg^3$, according to method ISO 2493-1 and SCAN-P 29:95 (equivalently 0.5 to 2.0 $Nm^7/kg^3$). The bending stiffness index is calculated as a geometric mean value for machine and transverse direction.

Figure 1:
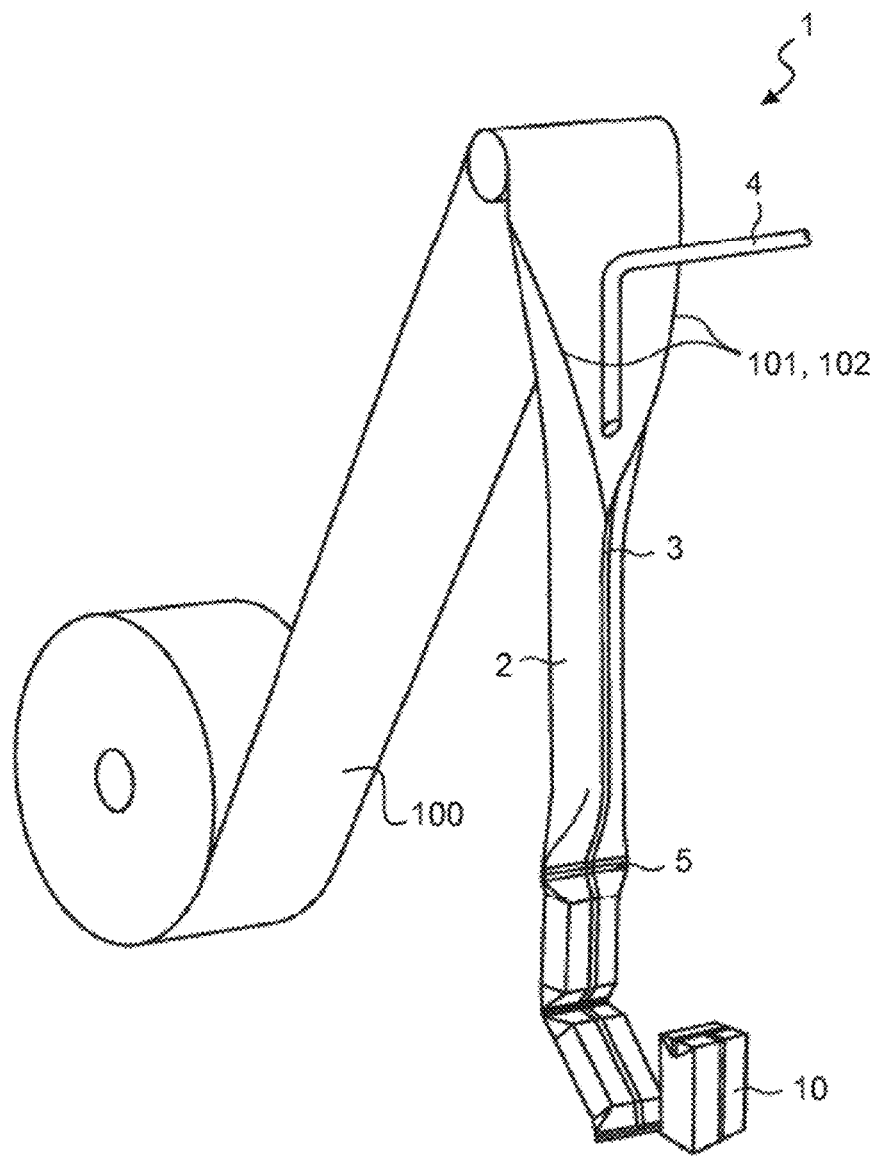
FIG. 1 is an isometric view of parts of a filling machine being configured to provide a series of consecutive liquid food packages from a tube of packaging material.

Now with reference to FIG. 1 parts of a filling machine 1 is illustrated. The filling machine 1 operates continuously and at high speed according to the following principle; a web of packaging material 100 is forwarded and formed into a tube 2 by the longitudinal edges 101, 102 of the packaging material 100 being united to one another in an overlap joint 3.

The tube 2 is filled with the intended liquid food product from a filling pipe 4 and is divided into individual packages 10 by repeated transversal seals 5 of the tube 2 at a pre-determined distance from one another below the level of the filled contents in the tube 2.

The packages 10 are separated by incisions in the transversal seals 5 and are given the desired geometric configuration by fold formation along prepared crease lines in the material.

Alternatively, similar packages may be made from pre-cut blanks or sheets of the laminated packaging material, which are folded and longitudinally sealed into tubular capsules, and then fold-formed at a first end, filled and sealed at the other end, in a stepwise filling operation.

Figure 2:
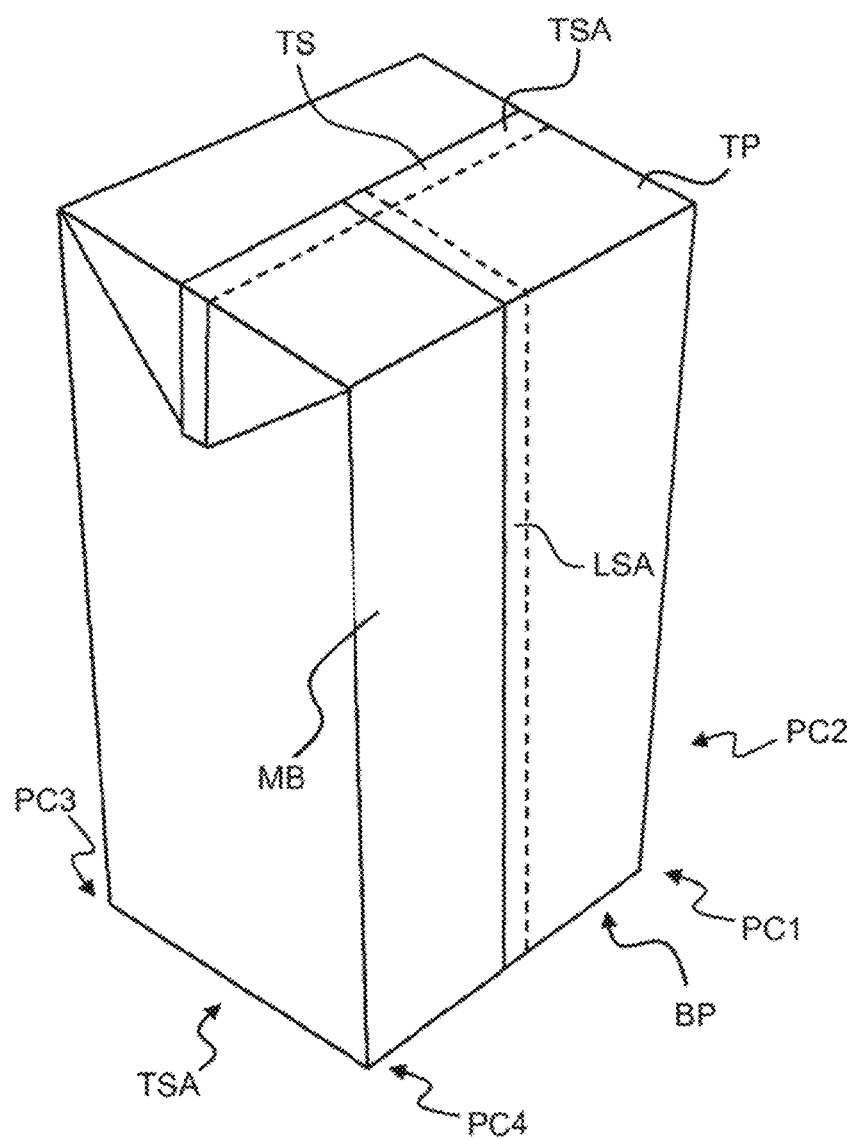
FIG. 2 is an isometric view of a package being produced from a packaging material.

A resulting package 10, from the packaging process of FIG. 1, is shown in further detail in FIG. 2. As illustrated here, the package 10 is formed by sealing the packaging material 100 both longitudinally, by means of a longitudinal overlapping sealing area LSA, and transversally, by means of upper and bottom transversal sealing areas TSA. The package 10 has a main body MB, closed by a top end TP and a bottom end BP. The package 10 is further provided with a number of corners PC1-PC4. In the shown example, four corners PC1-PC4 are present due to the rectangular shape of the bottom end TP. It should however be realized that the package 10 could have another number of corners, depending on the dimensions of the package 10.

Figure 3:
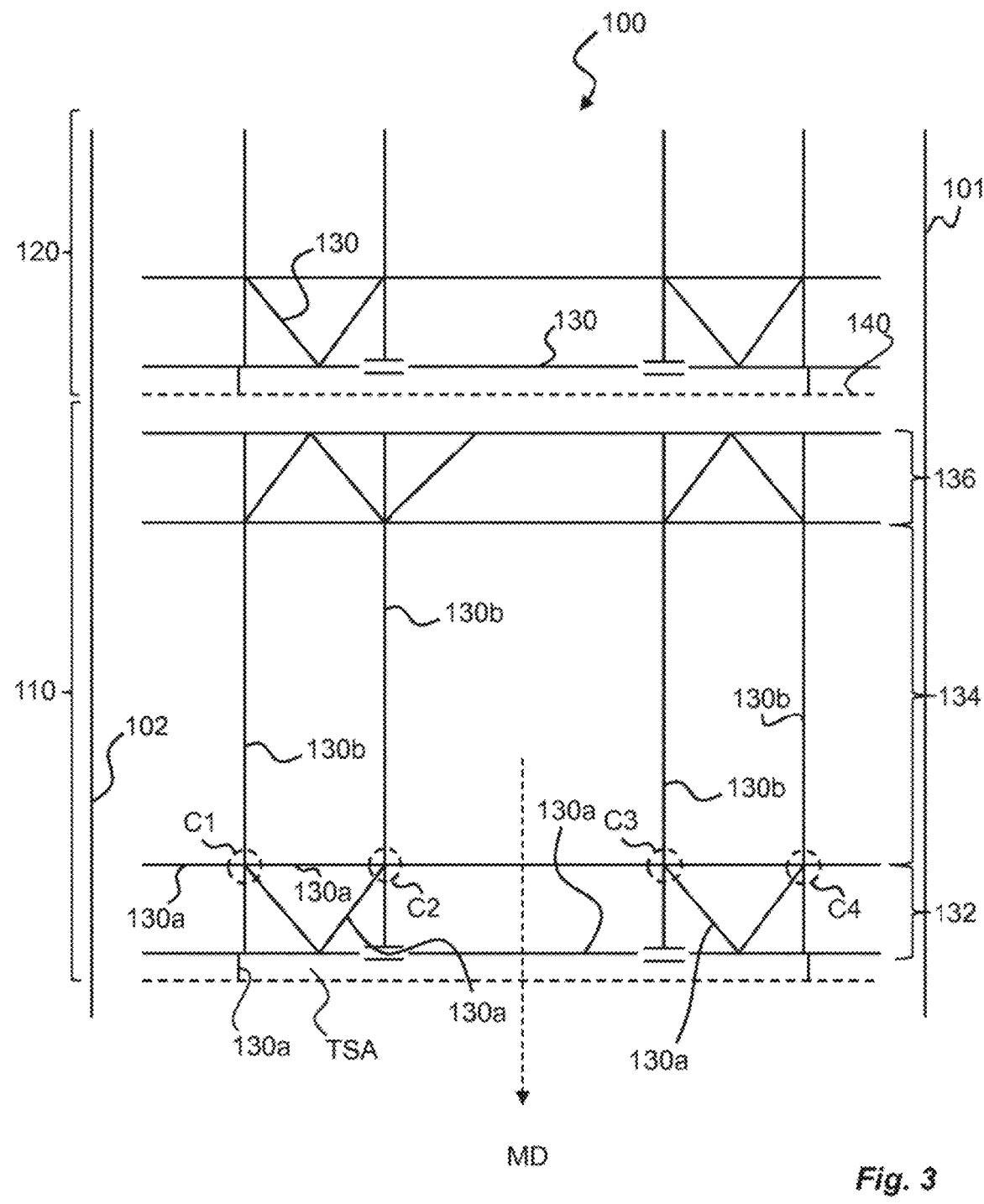
FIG. 3 is a top view of a web of packaging material according to prior art used to form packages.

In order to further understand the different embodiments described herein, a prior art example of a packaging material 100, designed to produce a package 10 as shown in FIG. 2, is schematically illustrated in FIG. 3. The shown packaging material 100 is e.g. configured to be fed into a filling machine 1 of the type shown in FIG. 1.

The packaging material 100 can for example be provided as a continuous web, being rolled in order to efficiently fit with the filling machine 1 of FIG. 1. For other applications the packaging material 100 can be provided as separate blanks, or in any other configuration being suitable for final shaping into individual packages 10 by folding along crease lines 130.

The width of the packaging material 100 corresponds to dimensions being required to form one single package 10. The web of packaging material 100 comprises a plurality of areas arranged in series; a first area 110 to form a first, or leading package 10, is followed by a second area 120 intended to form a second, or trailing package 10. The second area 120 is, as is readily understood, followed by a third area, a fourth area, etc (not shown).

Each area 110, 120 is provided with respective crease lines 130, shown as solid lines in FIG. 3. The crease lines 130 of the first area 110 are designed to define the shape of the first package 10, while the crease lines 130 of the second area 120 are designed to define the shape of the second and adjacent package 10.

Although only shown for the first area 110, the crease lines 130 of one area 110, 120 comprises a first set of crease lines 132 being designed to form a bottom end of the package 10, a second set of crease lines 134 being designed to form a main body of the package 10, and a third set of crease lines 136 being designed to form a closed upper end of the package 10.

It should be noted that only a few crease lines of FIG. 3 are provided with the reference numeral 130. In fact all solid lines shown inside the borders of the longitudinal edges 101, 102 are representing crease lines. There is also two dashed lines 140 extending perpendicular to the machine direction MD; these are to indicate the cutting line, i.e. where the cutting knife will separate the sealed package 10 from the upstream tube.

At this point it should be noted that the crease lines 130 could be provided in various configurations in order to provide folding directions for specific types of packages 10. The crease lines 130 are not only arranged in the so called machine direction MD, i.e. the longitudinal direction of the packaging material 100 (which is normally also the longitudinal or vertical direction of a formed package standing upright). There are also crease lines 130 being arranged in other directions, i.e. non-parallel, such as perpendicular, to the machine direction MD. For other systems and applications also within the concept of this specification, the longitudinal and transversal crease lines of a packaging material are in opposite directions, i.e. the machine direction corresponds to a transversal direction rather than a longitudinal direction (i.e. the vertical direction when seen at an upright standing package). This is particularly common when producing packages from individual blanks of packaging material, which embodiments are also within the concept of the present application.

As can be seen in FIG. 3, four areas C1-C4 are provided; these areas C1-C4 are arranged at a respective location intended to form a bottom corner PC1-PC4 of the package 10 to be formed. As can be seen in FIG. 3, each area C1-C4 forms an intersection between at least one crease line 130a of the first set of crease lines 132 and a longitudinal crease line 130b of the second set of crease lines 134.

As mentioned in the background section, there is a desire to further improve accuracy of package dimensions, especially in the areas of the bottom corners. The inventors have surprisingly realized that this may be accomplished by redesigning of the crease line arrangement.

Figure 4B:
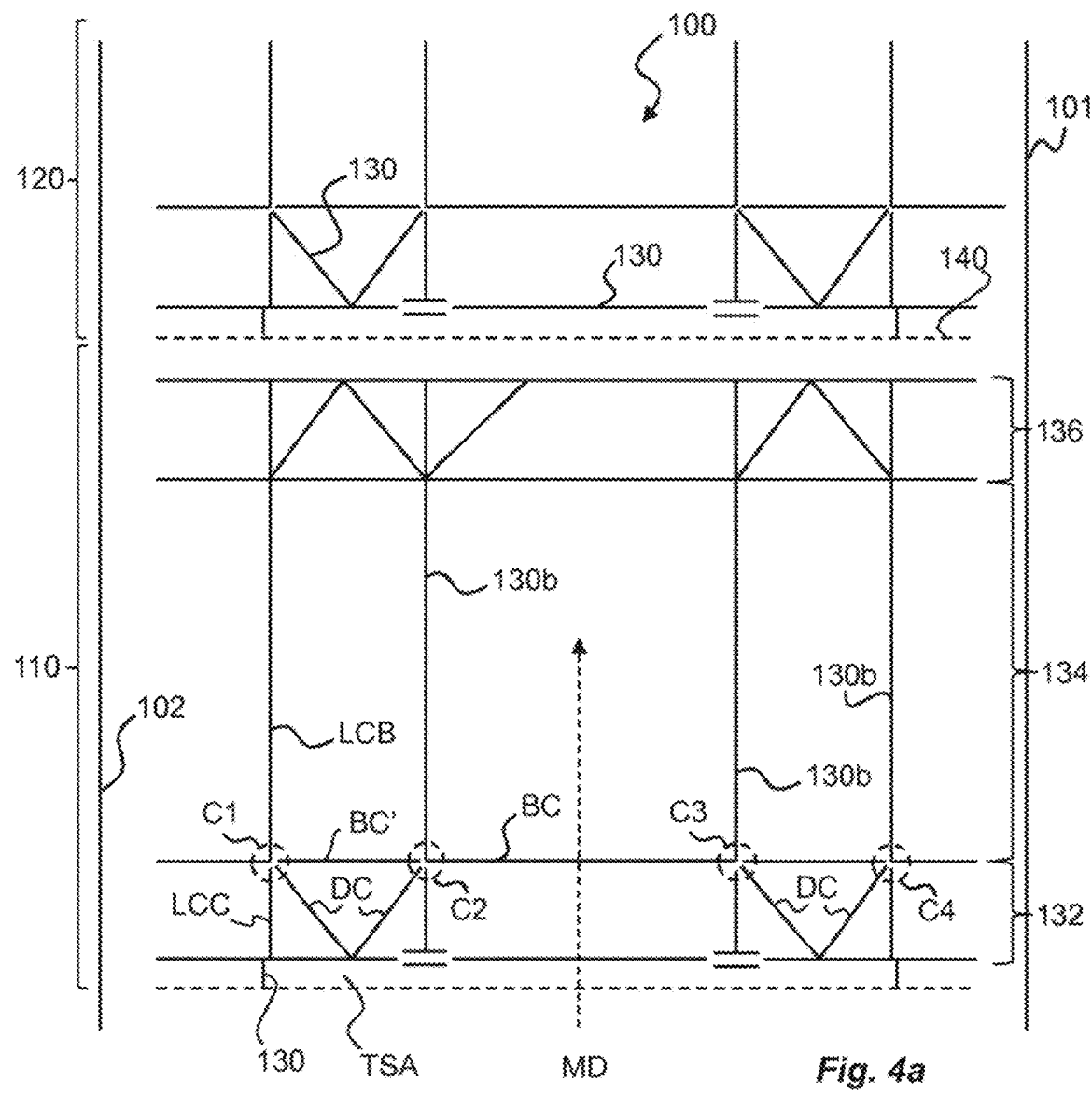
Figure 4B:
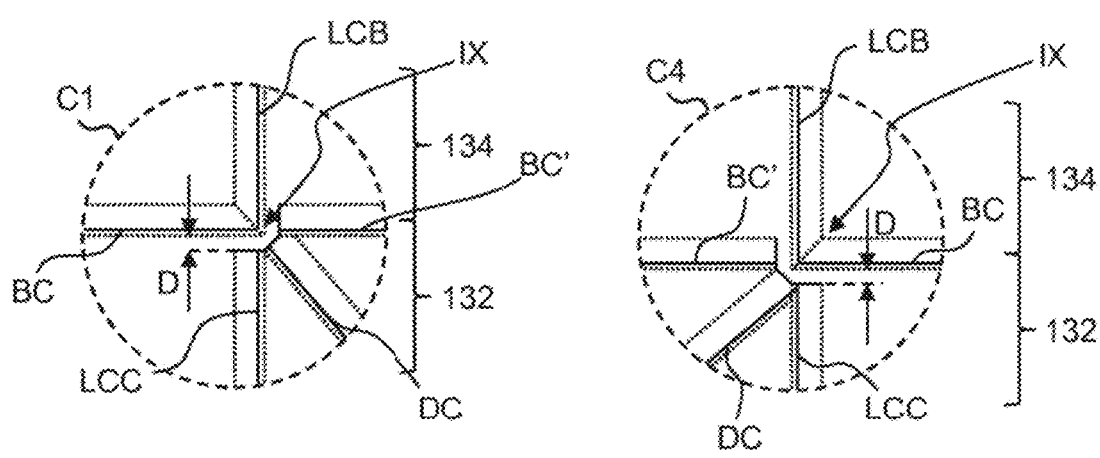

An embodiment of a packaging material 100, which has proven to be successful in solving the above-mentioned problem, is shown in FIG. 4a. The packaging material 100 is identical to the packaging material 100 shown in FIG. 3, except for the details of the areas C1-C4. One of these areas C1 is shown as an enlarged section in FIG. 4b.

As can be seen in FIG. 4a each area C1-C4 comprises an intersection IX (see FIG. 4b) of a plurality of crease lines of the first set of crease lines 132, i.e. crease lines intended to form the bottom portion BP of the package 10. A transversal crease lines BC runs across each areas C1-C4 and extends in a direction being perpendicular to the machine direction MD. The transversal crease line BC may be seen as separating the first set of crease lines 132 from the second set of crease lines 134. It is not important whether the transversal crease line BC is considered to belong to the first part of crease lines 132, the second part of crease lines 134, or both.

The intersection IX is formed by the transversal crease line BC meeting a longitudinal crease line LCB of the second set of crease lines 134, thus forming an L-shape. The longitudinal crease line LCB of the second set of crease line 134 is terminated at the intersection IX. As can be seen in FIG. 4b, also the transversal crease line BC is terminated at the intersection IX, and continuing beyond the intersection IX such that the transversal crease line BC is in fact comprising a plurality of segments BC, BC', all being aligned in the transversal direction and being distributed such that each area C1 will have only one segment of the transversal crease line BC intersecting with a respective longitudinal crease line LCB of the second set of crease lines 134. A segment of the crease line BC not intersecting with a longitudinal crease line LCB will from hereon be denoted BC'.

Except for the intersection IX, each area C1-C4 also comprises a diagonal crease line DC, and a longitudinal crease line LCC of the first set of crease lines 132. These two crease lines DC, LCC, together with another segment BC' of the transversal crease line BC, are not extending into the intersection IX but they are terminated before reaching the intersection IX; as shown in FIG. 4b. In FIG. 4b, the distance between the intersection IX and the ends of the crease lines LCC, DC (as well as the terminated segment BC' of the transversal segment BC) is indicated by reference numeral D. For a typical package of liquid food, the distance D may be in the range from 1 to 10 mm, such as from 1.5 to 5 mm, preferably in the range from 1.5 to 3 mm.

The inventors have surprisingly realized that improved forming of the corners PC1-PC4 of the package 10 is achieved when the crease lines BC, LCB, LCC, and DC are provided with a triangular, preferably asymmetric cross-section, in combination with the crease lines LCC, DC, BC' being terminated such that they end at a distance D from the intersection IX, as is shown in FIG. 4b.

In FIG. 4b the asymmetric configuration of the crease lines BC, LCB, LCC, and DC is shown. Each crease line BC, LCB, LCC, and DC is shown by three lines, one solid line having an associated dashed line on each side. The solid line indicates where an apex 225 (see FIG. 6a) has been pressed into the packaging material 100, while the transversal distance between the solid line and the most adjacent dashed line represents where a steep side 222a of a ridge 222 (again see FIG. 6a) has been pressed into the packaging material 100. The transversal distance between the solid line and the less adjacent dashed line consequently represents where a less steep side 222b (FIG. 6a) of a ridge 222 has been pressed into the packaging material.

Preferably, the orientation of the asymmetric crease lines BC, LCB, LCC, and DC is according to the following: LCB and BC are both aligned such that their respective steep side is facing the side of the intersection IX where the diagonal crease line DC is arranged. This diagonal crease line DC is in turn oriented such that the steep side is facing longitudinally downwards, i.e. towards the longitudinal crease line LCC. The longitudinal crease line LCC is oriented in the same direction as the longitudinal crease line LCB, i.e. the steep side of the crease line LCC is facing the diagonal crease line DC.

In the shown example the resulting bottom end BP of the package 10 will be rectangular, meaning that there will be four corners PC1-PC4 formed by four respective areas C1-C4. Each area C1-C4 comprises an intersection IX of a plurality of crease lines LCB, BC, while additional crease lines LCC; DC, BC' are terminated such that they end at a distance D from said intersection IX. All areas C1-C4 are thereby configured in a similar manner, in terms of aborting the crease line LCC; DC, BC' before reaching the intersection IX.

It should however be noted that for some embodiments, it is not required to have this configuration on all areas C1-C4. Instead, only one or more of the corner areas C1-C4 may be configured as described above with reference to FIG. 4b. For example tests have been performed, proposing substantial improvements of corner shaping if only the two rear corners PC1, PC4, are formed by folding of corner areas C1, C4 being designed with terminated crease lines BC', DC, LCC.

The two front corners PC2, PC3 may for such embodiments be formed by folding of areas C2-C3, which may be configured according to prior art designs. For the scope of this specification, advantages of bottom corner folding are present if at least one of the areas C1-C4 is configured according to what has been described with reference to FIG. 4b.

A package having a typical rear bottom corner defect, is shown in FIG. 12. The corners are not shaped as vertices of a cuboid but are dented and humpy, resulting in bad appearance of the package. As the bottom corners are dented and buckly, the stability of the standing package may be impaired. This defect is reduced and even entirely avoided by the corner crease configuration of the present invention.

Figure 4C:
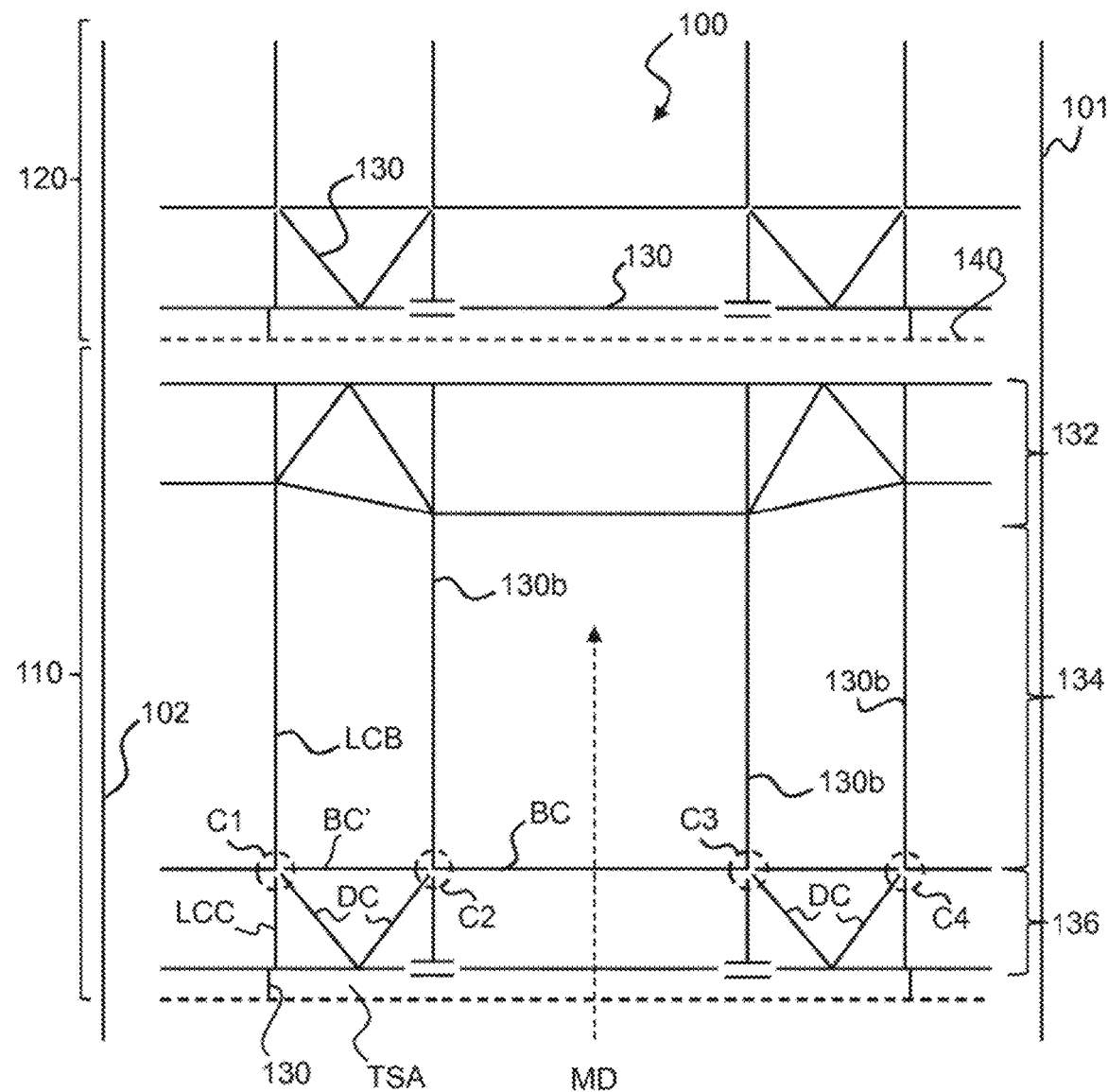
FIG. 4c is a top view of a web of packaging material according to an embodiment, used to form packages.

In FIG. 4a, the packaging material 100 is provided with crease lines 130 to form a rectangular shape package 10, for example shaped as a Tetra Brik® package. In FIG. 4c another example of a packaging material 100 is shown, for which the third set of crease lines 136 are configured to provide a slanted top portion, for example corresponding to a Tetra Brik® Aseptic Edge package. Also for such package, the bottom corner areas C1-C4 may be configured in accordance with the description of FIGS. 4a-b. However, for a Tetra Brik® Aseptic Edge package it may be advantageous to provide only the rear bottom corner areas C1, C4 in accordance with the description above, while traditional crease line pattern is provided for the front corners areas C2, C3.

Figure 5:
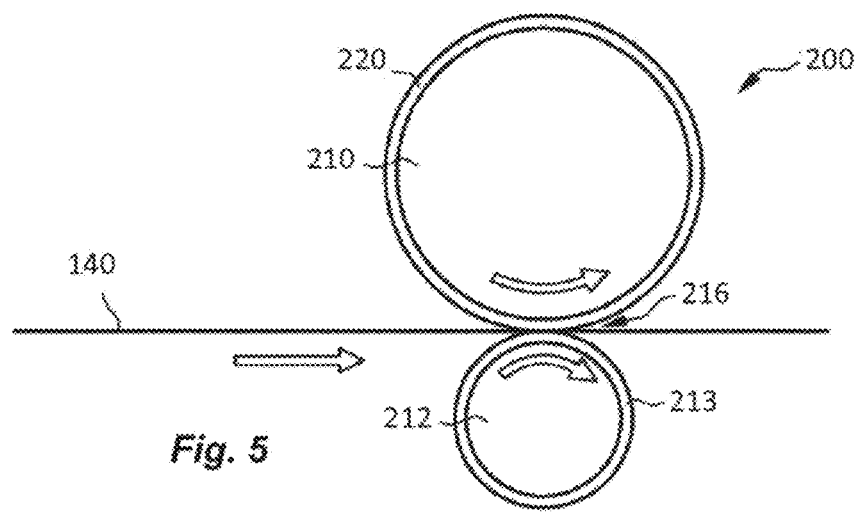
FIG. 5 is a cross-sectional view of a pressing tool for providing crease lines into a core material layer.

Now turning to FIG. 5 an example of a system 200 for providing the crease lines 130, BC, LCB, LCC, DC to a core material layer 140 of a later to be formed packaging material 100 is shown. Preferably the system 200 comprises a crease line pressing tool 210 in the form of a pressing tool roller, and an anvil 212 in the form of an anvil roller. At least one of the rollers 210, 212 are driven such the core material layer 140 may be fed into and passing through a nip 216 formed between the rollers 210, 212. As is shown in FIG. 5, the core material layer 140 may for this embodiment preferably be provided as a web thus allowing continuous operation of the system 200.

The pressing tool 210 is provided with a plate 220 covering at least a part of the outer periphery of the pressing tool roller 210. The plate 220 may e.g. be a metal body which may be curved in order to adapt to the cylindrical shape of the roller 210, or the plate 220 may be formed by a plurality of curved segments which together form an outer shell of the roller 210.

The plate 220 comprises at least one protrusive ridge 222 (see e.g. FIG. 6a) extending in a normal direction, i.e. radially outwards towards the anvil roller 212.

The anvil 212 forms a roller having an outer layer 213 of elastic material being reversibly deformable, such as a material composition comprising a rubber or a polymer having elastomeric properties. Preferably the elastic material is covering the entire surface of the roller 212 being in contact with the core material layer 140 to be creased. The elastic material may e.g. be a rubber-like material having a thickness of approximately 2-50 mm and having a hardness of from 70 shore A to 80 shore D, e.g. 60 Shore D or 95 Shore A.

Preferably the diameter of the pressing tool roller 210 is not the same as the diameter of the anvil roller 212. As is shown in FIG. 5 the anvil roller 212 has a smaller diameter than the pressing tool roller 210, however the anvil roller 212 could have a larger diameter than the pressing tool roller 210 in some embodiments. By providing different diameters of the rollers 210, 212 the ridges 222 of the pressing tool plate 220 will not impact the same positions of the anvil roller 212 during operation, whereby increased durability of the anvil roller 212 is ensured. It is thus understood that in a most preferred embodiment the diameter of one of the rollers 210, 212 is different than the diameter of the other roller 210, 212, as well as being different from any multiples of the circumference of the other roller.

Figure 6A:
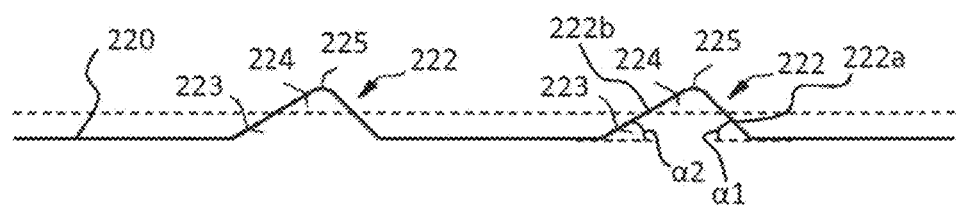
FIG. 6a is a cross-sectional view of a plate of a pressing tool, e.g. the pressing tool shown in FIG. 5.

FIG. 6a shows an embodiment of the configuration of the ridge 222, having a base portion 223, an imprint portion 224, and an apex 225. The plate 220 is shown to comprise at least two spaced apart ridges 222, each one extending to form a longitudinal structure suitable for providing a crease line 130 to a core material layer 140. The cross-section of each ridge 222 is triangular, whereby the base portion 223 is formed by the lower part of the ridge 222, i.e. the part being arranged adjacent to the planar surface of the plate 220. The imprint portion 224, i.e. the part of the ridge 222 being in contact with the core material layer 140 during creasing, extends from the base portion 223 to the apex 225.

The shown ridge 222 has a steep side 222a, and a less steep side 222b. The sides 222a, 222b meet at the apex 225. This means that an angle $\alpha 1$ between the steep side 222a and the plane of the plate 220 is greater than an angle $\alpha 2$ between the less steep side 222b and the same plane of the plate 220, as also indicated in FIG. 6a. Consequently, although less pronounced due to elasticity in the materials, one side of a resulting crease line will be steeper than the other side of the same crease line.

Figure 6B:
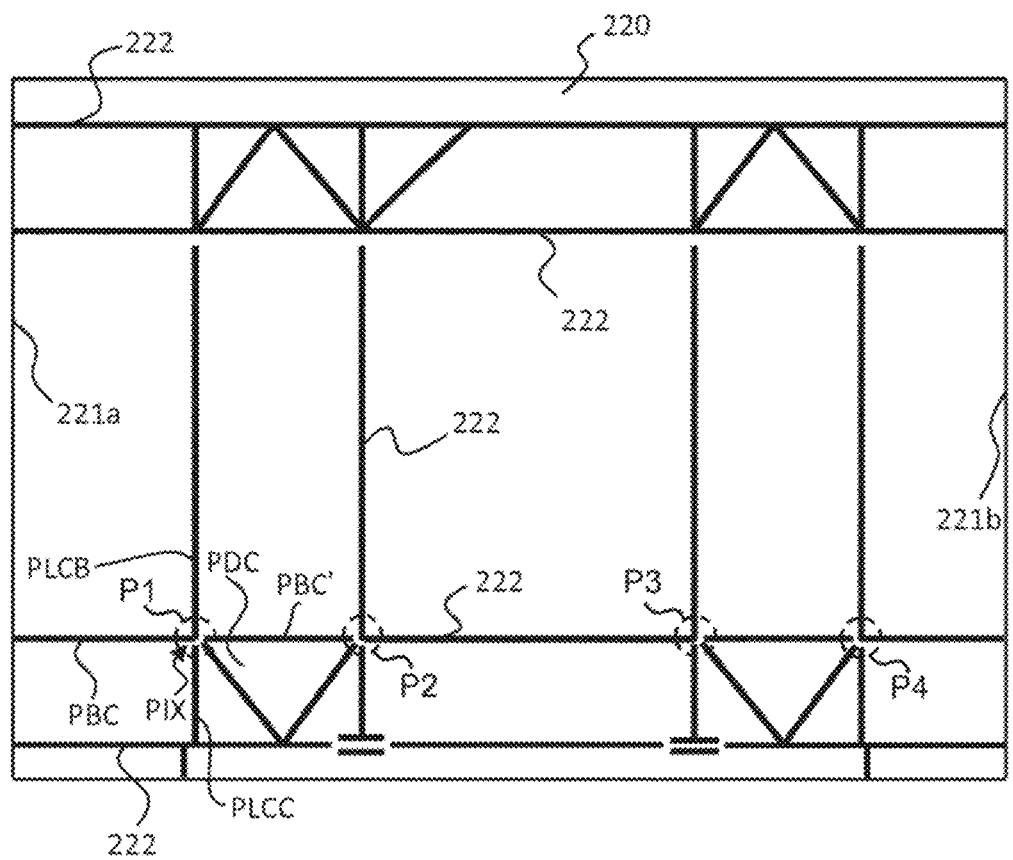
FIG. 6b is a top view of the plate shown in FIG. 6a, FIG. 7 is an enlarged, cross-sectional view of a creasing tool, pressing and imprinting a crease line into the web of packaging material, as shown in FIG. 4a-4c.

In FIG. 6b a top view of the plate 220 is shown. The plate 220 comprises a number of ridges 222, each ridge 222 being configured to provide a crease line 130 in the core material layer 140. However, some of the ridges PBC, PLCB, PLCC, PDC are configured to provide the crease lines BC, LCB, LCC, DC of the areas C1-C4 intended to assist in forming the corners PC1-PC4 of the package 10, as described earlier.

These ridges PBC, PLCB, PLCC, PDC are provided with a triangular, preferably asymmetric cross-section, and they are arranged at respective areas P1-P4 such that a creasing operation using the plate 220 will result in a packaging material 100 having areas C1-C4 as described earlier, especially with reference to FIG. 4b. The arrangement of the ridges PBC, PLCB, PLCC, PDC in FIG. 6b therefore corresponds to the arrangement of crease lines shown in FIG. 4a.

Should the ridges be triangular and symmetrical, the angle and dimensions of the steep side 222a would be essentially identical to the angle and dimensions of the less steep side 222b.

Figure 7:
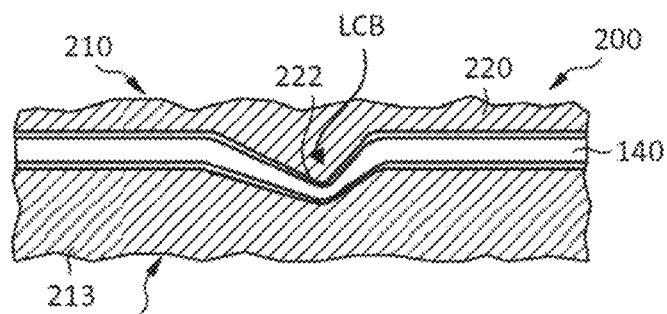

Operation of the creasing system 200 is shown in further details in FIG. 7. Here a cross-sectional view of the process of creation of a crease line, such as any of the crease lines BC, LCB, LCC, DC is illustrated schematically.

This method of providing a triangular crease lines BC, LCB, LCC, DC to a packaging material layer 140 will create one significant zone of shear fracture initiation in the core material layer 140 at a position corresponding to the position of the less steep side 222b of the imprint portion 224.

By operating the pressing tool 210 the applied force will cause stresses directed from the side of the packaging material layer 140 facing the plate 220.

The crease lines BC, LCB, LCC, DC will typically provide a thickness reduction of the imprinted or embossed core material layer 140, compared to uncreased material, of from about 5% to about 25%, such as from about 10 to about 25%.

Figure 8:
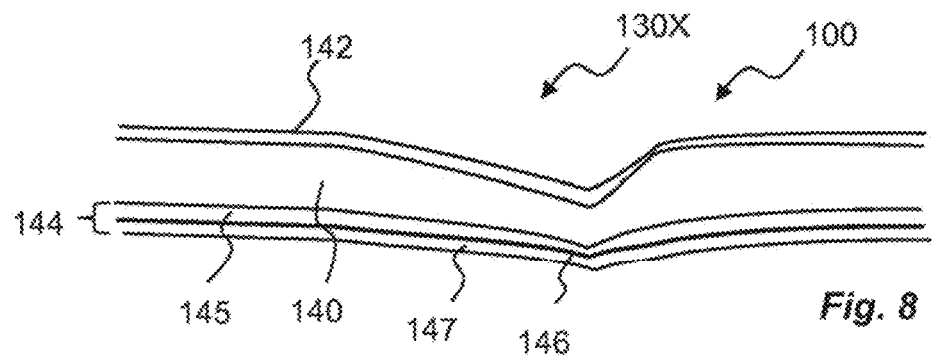
FIG. 8 is a cross-sectional view of a packaging material according to an embodiment, being provided with a crease line having a triangular profile.

An example of a creased packaging material 100 is shown in FIG. 8. For this example, the core material layer 140 has been laminated by means of an outer layer 142 as well as an inner layer 144. The outer layer 142 as well as the inner layer 144 can be provided as multi-layer structures; as shown in FIG. 8, the inner layer 144 is formed by an interior lamination layer 145, an intermediate barrier layer 146, and an innermost layer 147, which is to be in contact with the filled product contained in a package made from the packaging material. The packaging material is preferably imprinted by the crease lines from the outside of the material, i.e. on the side provided with the outer layer 142.

Any thermoplastic material or polymer may be coated onto or laminated to the core layer either before or after performing the creasing operation. Thus, when referring to creasing of the packaging material, the term packaging material includes creasing of the core layer alone, and then laminating further layers into a laminated packaging material, as well as creasing of an already (partly or completely) laminated structure including the core layer. This versatility is valid for all embodiments described within this specification.

The outer layer 142 may be formed by an outermost liquid-tight coating of a heat sealable thermoplastic polymer. The thermoplastic polymer may for example be a polyolefin such as polyethylene (PE) or polypropylene (PP), such as a low-density polyethylene (LDPE), or a blend of LDPE with a linear low density polyethylene.

In order to provide the packaging material 100 with barrier properties, mainly against gases, in particular oxygen, the packaging material additionally has at least one further layer 146 of a material which provides such barrier properties and which is bonded to the core material layer 140 layer by the interior lamination layer 145 lamination layer, preferably of low-density polyethylene (LDPE).

Examples of materials for the intermediate barrier layer 146 can be a layer or film containing a polymer with inherent barrier properties, for example a copolymer of ethylene and vinyl alcohol (EVOH) or a polyamide (PA), or a prefabricated film coated with a liquid-film-coated or vacuum-deposited or vapour-deposited layer or coating having corresponding barrier properties. A common example of coated prefabricated films of this kind is that of oriented films of polyester, for example polyethylene terephthalate (PET), or of polypropylene (PP), coated with a metallized layer or with a layer coated by plasma-enhanced vapour deposition. An aluminium foil is generally used which, in addition to having excellent barrier properties against gases, in particular oxygen, also has the advantageous property of allowing the packaging material 100 to be heat-sealed by induction sealing, which is a rapid, simple and effective heat-sealing technique.

Figure 9:
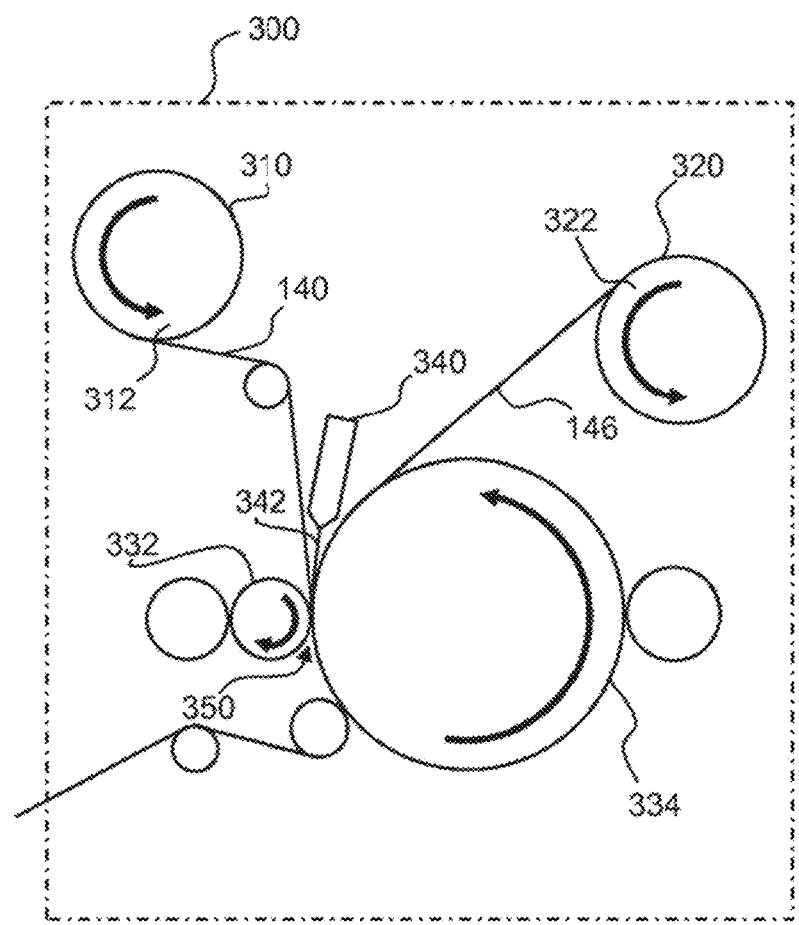
FIG. 9 is a system for producing a packaging material according to an embodiment.

An example of a system 300 for producing the packaging material 100 is shown in FIG. 9. The system 300 comprises a supply 310 of core material 140, being unwound from a storage reel 312, and a supply 320 of intermediate barrier layer 146 being unwound from a corresponding storage reel 322. The two webs 140, 146 are brought together with each other and are both guided through a lamination nip 350 between two adjacent rotatable cylinders 332, 334, while at the same time a supply 340 of laminating material 342, usually comprising low-density polyethylene (LDPE) forming the interior lamination layer 145, is applied between the webs 140, 146 in order to permanently bind the intermediate barrier layer 146 to the core material layer 140.

The paper or paperboard web is thereafter (not shown) provided on both sides with liquid-tight coatings of polymer, such as polyethylene, normally comprising low-density polyethylene (LDPE), forming the outer layer 142 and the innermost layer 147 of the inner side, and is then wound up on finished packaging reels for onward transport and handling.

By using triangular, preferably asymmetric crease lines 130 for the core material layer 140 it is possible to reduce the thicknesses of some laminate layers without decreasing the robustness of the packaging material and thus without risking material damage in sensitive areas. In the case of asymmetric crease lines, having a triangular cross-section, such that a first side of the crease line has a steeper imprint wall than the second side, it has been proven that in the step of laminating the core material layer to further layers of polymer, the core material should preferably be fed into the lamination roller nip such that crease lines enter the lamination nip with their second side first. The combination of using asymmetric crease lines with a well-determined feeding direction during lamination reduces any risk for defects, whereby increased lamination speed and quality may be achieved.

Figure 10:
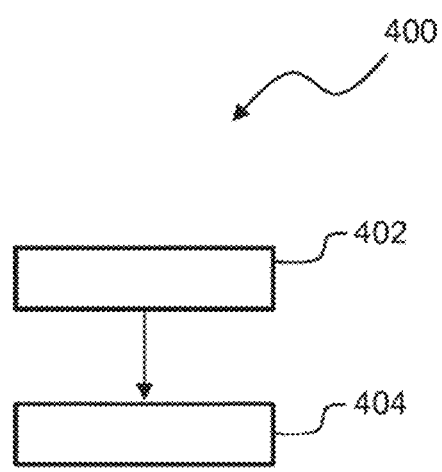
FIG. 10 is a schematic view of a method for producing a packaging material according to an embodiment.
Figure 11:
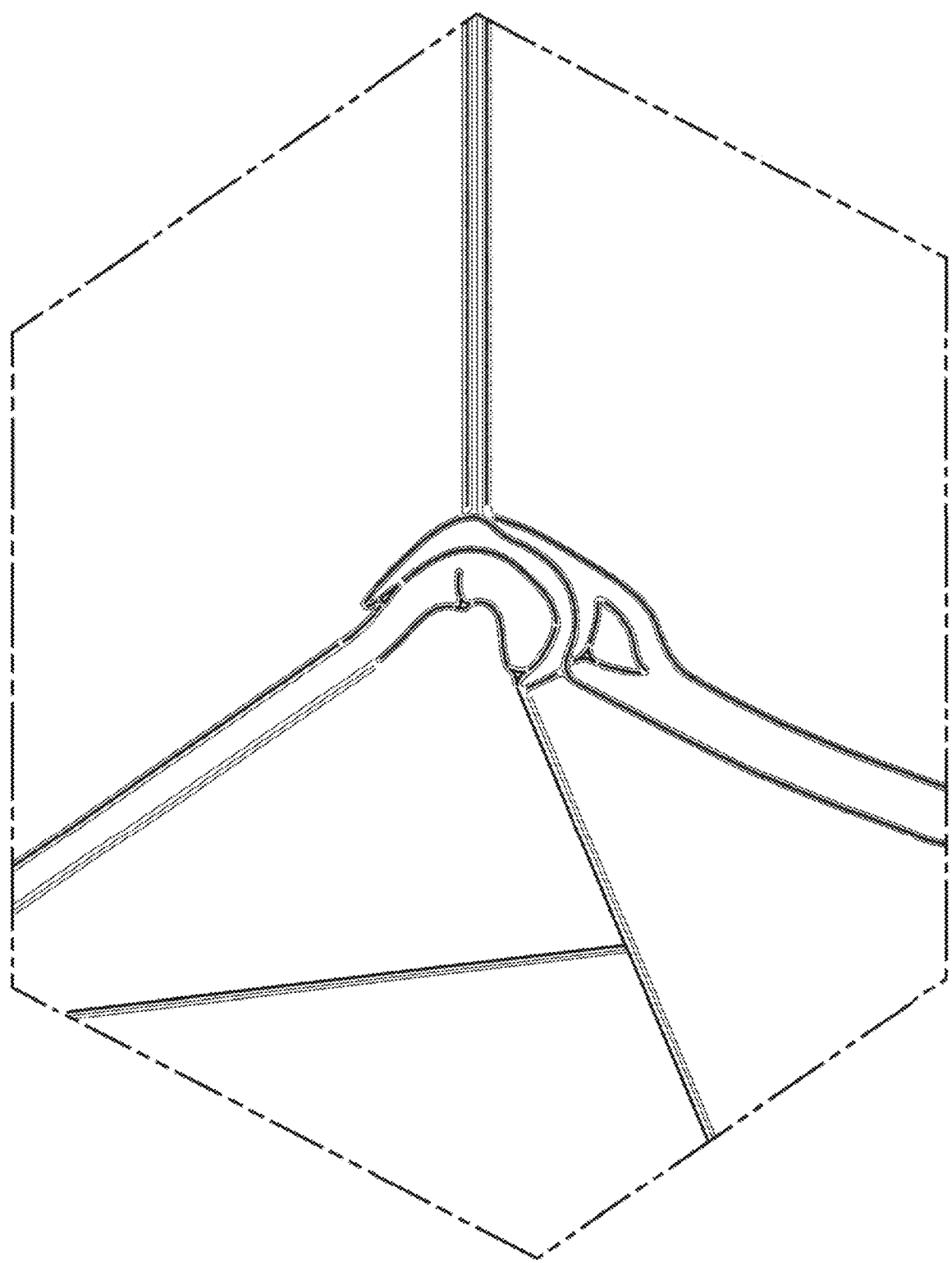
FIG. 11 shows a package corner from a prior art corner crease configuration being defect.

Now turning to FIG. 10 a method 400 for producing a packaging material 100 is schematically illustrated. The method 400 comprises a first step 402 of providing a core material layer 140 or a plastic-coated or laminated packaging material 100 with at least one area C1-C4 being configured to assist in folding the packaging material 100 into a bottom end corner PC1-PC4 of a package 10 to be formed, and a second step 404 of providing a first set of crease lines 132 being designed to form a bottom end TP of the package 10, and a second set of crease lines 134 being designed to form a main body MB of the package 10. Steps 402 and 404 are performed such that said at least one area C1-C4 comprises an intersection IX of a plurality of crease lines BC, LCB, each having a triangular, preferably asymmetric cross-section, while a plurality of crease lines LCC, DC, BC' of the first set of crease lines 134, each having a triangular, preferably asymmetric cross-section and having a virtual extension through said intersection IX, are terminated such that they end at a distance D from said intersection IX.

The core material layer is laminated to further material layers either before or after the creasing operation.

From the description above follows that, although various embodiments of the invention have been described and shown, the invention is not restricted thereto, but may also be embodied in other ways within the scope of the subject-matter defined in the following claims.

The invention claimed is:

1. A packaging material, comprising:
   a core material layer,
   at least one polymer layer laminated to the core material layer,
   wherein the core material layer is provided with at least one area being configured to assist in folding the packaging material into a bottom end corner of a package to be formed,
   a first set of crease lines configured to form a bottom end of the package and a first portion of an intersection between the bottom end of the package and a main body of the package, and a second set of crease lines configured to form the main body of the package and a second portion of the intersection between the bottom end of the package and the main body of the package,
   said at least one area comprising an intersection of a first plurality of crease lines of the second set of crease lines, each having a triangular cross-section, while a second plurality of crease lines of the first set of crease lines, each having a triangular cross-section and having a virtual extension through said intersection, terminate such that they end at a distance from said intersection and constitute terminated crease lines,
wherein the terminated crease lines of the at least one area comprises one transversal crease line, one longitudinal crease line, and one diagonal crease line.

2. The packaging material according to claim 1, wherein a virtual extension of one of the terminated crease lines of the first set of crease lines substantially coincides with one intersecting crease line of the second set of crease lines.

3. The packaging material according to claim 1, wherein the intersecting crease lines are perpendicular to each other.

4. The packaging material according to claim 1, wherein the distance is from 1 to 10 mm.

5. The packaging material according to claim 1, comprising two areas configured to form two rear bottom corners of the package, wherein each of the two areas comprises an intersection of a first plurality of crease lines, each having a triangular cross-section, while a second plurality of crease lines of the first set of crease lines, each having a triangular cross-section and having a virtual extension through said intersection, terminate such that they end at a distance from said intersection.

6. The packaging material according to claim 5, wherein the two areas are configured to form bottom corners arranged on opposite sides of a longitudinal sealing area.

7. The packaging material according to claim 1, comprising four areas configured to form four bottom corners of the package, wherein each area comprises an intersection of a first plurality of crease lines, each having a triangular cross-section, while a second plurality of crease lines of the first set of crease lines, each having a triangular cross-section and having a virtual extension through said intersection, terminate such that they end at a distance from said intersection.

8. The packaging material according to claim 1, wherein the cross-section of the triangular crease lines is asymmetric.

9. A package produced by sealing and forming a packaging material according to claim 1.

10. A packaging material, comprising:
a core material layer,
at least one polymer layer laminated to the core material layer,
wherein the core material layer is provided with at least one area being configured to assist in folding the packaging material into a bottom end corner of a package to be formed,
a first set of crease lines configured to form a bottom end of the package and a first portion of an intersection between the bottom end of the package and a main body of the package, and a second set of crease lines configured to form the main body of the package and a second portion of the intersection between the bottom end of the package and the main body of the package,
said at least one area comprising, prior to folding of the packaging material, an intersection of a first plurality of crease lines of the second set of crease lines, each having a triangular cross-section, while a second plurality of crease lines of the first set of crease lines, each having a triangular cross-section and having a virtual extension through said intersection, terminate such that they end at a distance from said intersection and constitute terminated crease lines.

11. The packaging material according to claim 10, wherein a virtual extension of one of the terminated crease lines of the first set of crease lines substantially coincides with one intersecting crease line of the second set of crease lines.

12. The packaging material according to claim 10, wherein the terminated crease lines of the at least one area comprises one transversal crease line, one longitudinal crease line, and one diagonal crease line.

13. The packaging material according to claim 10, wherein the intersecting crease lines are perpendicular to each other.

14. The packaging material according to claim 10, wherein the distance is from 1 to 10 mm.

15. The packaging material according to claim 10, comprising two areas configured to form two rear bottom corners of the package, wherein each of the two areas comprises an intersection of a first plurality of crease lines, each having a triangular cross-section, while a second plurality of crease lines of the first set of crease lines, each having a triangular cross-section and having a virtual extension through said intersection, terminate such that they end at a distance from said intersection.

16. The packaging material according to claim 15, wherein the two areas are configured to form bottom corners arranged on opposite sides of a longitudinal sealing area.

17. The packaging material according to claim 10, comprising four areas configured to form four bottom corners of the package, wherein each area comprises an intersection of a first plurality of crease lines, each having a triangular cross-section, while a second plurality of crease lines of the first set of crease lines, each having a triangular cross-section and having a virtual extension through said intersection, terminate such that they end at a distance from said intersection.

18. The packaging material according to claim 10, wherein the cross-section of the triangular crease lines is asymmetric.

19. A package produced by sealing and forming a packaging material according to claim 10.

* * * * *